J. LASH.
Bee Hive.
No. 43,779.  Patented Aug. 9, 1864.
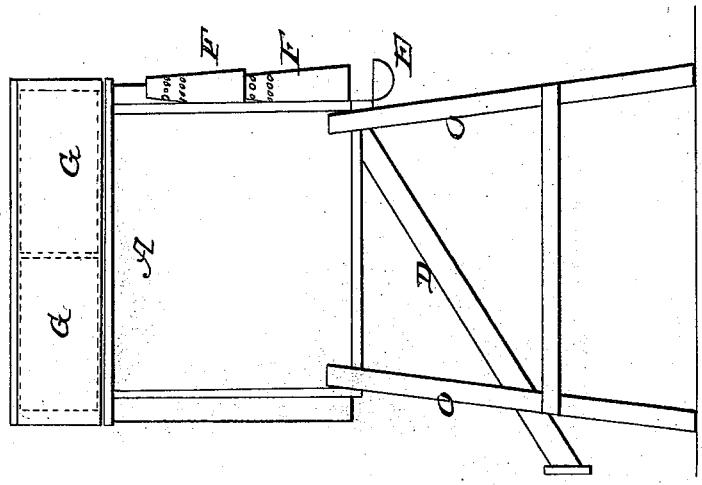
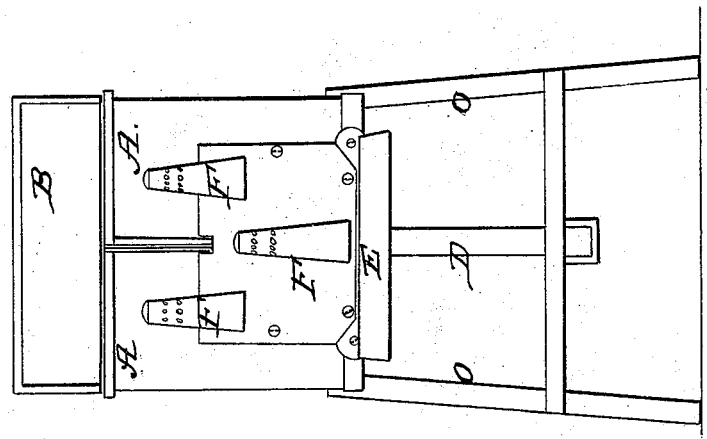
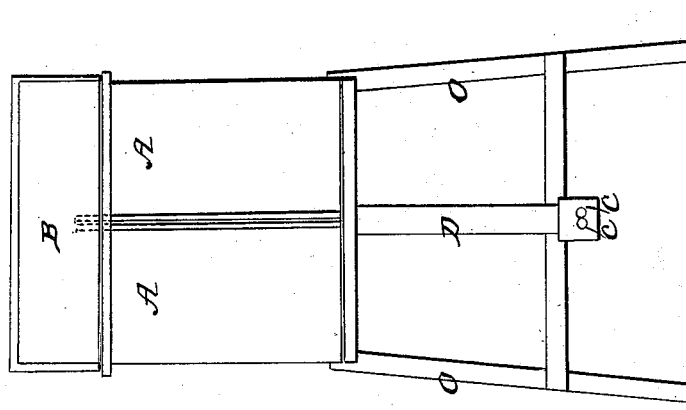

UNITED STATES PATENT OFFICE.

JOSEPH LASH, OF MOUNT VERNON, NEBRASKA TERRITORY.

IMPROVEMENT IN BEE-HIVES.

Specification forming part of Letters Patent No. 43,779, dated August 9, 1864.

*To all whom it may concern:*

Be it known that I, JOSEPH LASH, of Mount Vernon, in the county of Nemaha and Territory of Nebraska, have invented a new and useful Improvement in Bee-Hives; and I do hereby declare that the following is a full and exact description thereof, reference being had to the accompanying drawings, and to the letters of reference marked thereon.

The nature of my invention consists, first, in constructing a bee-hive in two apartments or sections, one of which may be separated from the hive at pleasure, to prevent the bees from swarming; second, in constructing a hive in which the bee moth is prevented from entering; and, third, in providing a hive with ventilation, which is beneficial to both bees and honey.

Figure I is a front view of the bee hive. Fig. II is a rear view of the same, and Fig. III is a side view.

A A, Figs. I, II, and III, is the main hive, constructed in two sections or apartments, one of which may be removed at pleasure, to divide the bees, and thus prevent their swarming.

B, Figs. I and II, is a cover placed over the top of the hive, constructed in the form of a square shallow box, one side of which is open and rests on the outer edges of the hive. This cover, not being attached to the hive, may be removed at pleasure.

D is the tube through which the bees enter the hive, entering the tube at the holes C C, Fig. I.

E, Figs. II and III, is a trough or moth-trap, constructed of tin or other suitable material, and attached to the back part of the hive, near the bottom.

F F, Figs. II and III, are ventilators or pipes, constructed of tin or other suitable material, placed at the back part of the hive. Near the base of each ventilator, on the side next to the hive, is a hole which communicates with the inside of the hive through a corresponding aperture in the side of the hive. The tops of the ventilators are perforated with small holes, which will allow the gases and foul air generated in the hive to escape.

G G, Fig. III, are honey-boxes, placed on the top of the hive, covering holes through which the bees enter the boxes. The honey-boxes are surrounded and covered by the cover B, Figs. I and II.

O O, Figs. I, II, and III, are legs, which rest on the ground and support the hive.

The bees enter the holes C C and pass through the tube D into either of the sections or apartments of the hive. The air enters the hive through the tube D, and passes out through the ventilators F F, being impregnated with the scent of the honey and the gases within the hive. Moths or other insects, being attracted by the scent of the honey, will collect around the ventilators F F, but the holes in them being too small for them to enter, they will fall into the trough E, where they may be destroyed. As there will be no odor of honey escaping through the holes C C in the tube D, the moth will not be attracted there, and therefore will not enter the hive through the tube.

In my hive the bees may be readily prevented from swarming, when it is so desired, by detaching the movable section or apartment of the main hive, and thus dividing the swarm. It also admits of free ventilation to the hive, and effectually prevents bee-moths and other injurious and destructive insects from entering the hive.

What I claim as my invention, and desire to secure by Letters Patent, is—

1. The ventilators F F, in combination with the trough E, substantially as shown and described.

2. The tube D, constructed and used substantially as set forth, in combination with the ventilators and trough or trap.

JOSEPH LASH.

Witnesses:
   THOMAS R. FISHER,
   C. W. WHEELER.